(12) United States Patent
Björklund et al.

(10) Patent No.: US 10,809,746 B2
(45) Date of Patent: Oct. 20, 2020

(54) METHOD AND ARRANGEMENT FOR OPERATING A METALLURGICAL FURNACE AND COMPUTER PROGRAM PRODUCT

(71) Applicant: OUTOTEC (FINLAND) OY, Espoo (FI)

(72) Inventors: Peter Björklund, Espoo (FI); Oskari Karhuvaara, Espoo (FI); Mikael P. Jåfs, Kirkkonummi (FI); Lauri P. Pesonen, Oakville (CA)

(73) Assignee: OUTOTEC (FINLAND) OY, Espoo (FI)

( * ) Notice: Subject to any disclaimer, the term of this patent is extended or adjusted under 35 U.S.C. 154(b) by 279 days.

(21) Appl. No.: 15/564,478

(22) PCT Filed: Apr. 8, 2016

(86) PCT No.: PCT/FI2016/050219
§ 371 (c)(1),
(2) Date: Oct. 5, 2017

(87) PCT Pub. No.: WO2016/162603
PCT Pub. Date: Oct. 13, 2016

(65) Prior Publication Data
US 2018/0073102 A1 Mar. 15, 2018

(30) Foreign Application Priority Data

Apr. 10, 2015 (FI) .................................. 20155266

(51) Int. Cl.
*G05D 21/00* (2006.01)
*F27D 21/00* (2006.01)
(Continued)

(52) U.S. Cl.
CPC .............. *G05D 21/00* (2013.01); *C21C 5/30* (2013.01); *C21C 5/4673* (2013.01); *C22B 7/04* (2013.01);
(Continued)

(58) Field of Classification Search
CPC . C21C 5/4673; C21C 5/30; C21C 2005/5288; C22B 7/04; C22B 2300/06;
(Continued)

(56) References Cited

U.S. PATENT DOCUMENTS

| 4,514,218 A | * | 4/1985 | Inagaki ................. C21C 5/5211 75/10.12 |
| 2002/0040623 A1 | | 4/2002 | Stendera et al. |

(Continued)

FOREIGN PATENT DOCUMENTS

| CN | 203385304 U | 1/2014 |
| CN | 107272769 A | 10/2017 |

(Continued)

OTHER PUBLICATIONS

JP 2003-222319 A machine translation of the description (Year: 2003).*

(Continued)

*Primary Examiner* — Tima M. McGuthry-Banks
(74) *Attorney, Agent, or Firm* — Buchanan Ingersoll & Rooney PC (57) ABSTRACT

Provided are a method and an arrangement for operating a metallurgical furnace. The method comprises a feeding step, and a temperature controlling step for controlling the temperature of a molten metal layer and a slag layer in a furnace space of the metallurgical furnace. The temperature controlling step comprises a first measuring step for measuring the slag temperature ($T_{slag}$), a second measuring step for measuring the slag liquidus temperature ($T_{slag,\ liquidus}$), and a (Continued)

calculating step for calculating a superheat temperature ($T_{superheat}$) by calculating the temperature difference between the slag temperature ($T_{slag}$) and the slag liquidus temperature ($T_{slag,\ liquidus}$). In case the calculated superheat temperature ($T_{superheat}$) is outside a predefined superheat temperature range ($T_{superheat\ set}$), the method comprises an adjusting step for adjusting to adjust the actual superheat temperature. Also provided are computer program products.

12 Claims, 5 Drawing Sheets

(51) Int. Cl.

| | | |
|---|---|---|
| *C21C 5/46* | (2006.01) | |
| *F27D 19/00* | (2006.01) | |
| *G05D 23/19* | (2006.01) | |
| *F23N 5/00* | (2006.01) | |
| *C21C 5/30* | (2006.01) | |
| *C22B 7/04* | (2006.01) | |
| *C21C 5/52* | (2006.01) | |

(52) U.S. Cl.
CPC .............. *F23N 5/00* (2013.01); *F27D 19/00* (2013.01); *F27D 21/00* (2013.01); *G05D 23/1932* (2013.01); *C21C 2005/5288* (2013.01); *F27D 2019/0003* (2013.01); *Y02P 10/216* (2015.11)

(58) Field of Classification Search
CPC ............. C21B 2300/04; C21B 2400/00; F27D 2001/1689; F27D 19/00; F27D 21/00; F23N 5/00; G05D 21/00; G05D 23/19–32; G05D 23/1932
See application file for complete search history.

(56) References Cited

U.S. PATENT DOCUMENTS

| | | | |
|---|---|---|---|
| 2011/0146447 A1 | 6/2011 | Reichel | |
| 2013/0180361 A1 | 7/2013 | Dry et al. | |
| 2015/0232961 A1* | 8/2015 | Imris | C22B 5/16 501/1 |

FOREIGN PATENT DOCUMENTS

| | | | |
|---|---|---|---|
| GB | 1577416 | A | 10/1980 |
| JP | S52-133031 | A | 11/1977 |
| JP | 2000-129368 | A | 5/2000 |
| JP | 2003-222319 | A | 8/2003 |
| JP | 2009-85549 | * | 4/2009 |
| JP | 2013-537259 | A | 9/2013 |
| KR | 10-2008-0031787 | A | 4/2008 |
| WO | WO 01/72090 | A1 | 9/2001 |
| WO | 2011/089621 | A2 | 7/2011 |
| WO | WO 2012/034184 | A1 | 3/2012 |
| WO | WO 2014046593 | A1 * | 3/2014 |

OTHER PUBLICATIONS

Family data for US 20150232961 including WO 2014046593 publication date (Year: 2014).*
JP 2009-85549 machine translation of the description (Year: 2009).*
Human translation, JP 200985549 A (Year: 2009).*
Office Action issued by the Chilean Patent Office in corresponding Chilean Patent Application No. 201702535 dated Jun. 3, 2019 (8 pages).
Notice of Grounds for Rejection issued by the Korean Intellectual Property Office in corresponding Korean Patent Application No. 10-2017-7030218 dated Sep. 14, 2018 (12 pages including partial English translation).
Search Report dated Nov. 20, 2015, by the Finnish Patent and Registration Office in corresponding Finnish Patent Application No. 20155266 (2 pages).
Notification of Reason for Refusal issued by the Japanese Patent Office in corresponding Japanese Patent Application No. 2017-552995 dated Aug. 21, 2018 (14 pages including partial English translation).
Opposition filed against the corresponding Chilean Patent Application dated Aug. 27, 2018 (11 pages).
International Search Report (PCT/ISA/210) dated Jul. 7, 2016, by the European Patent Office as the International Searching Authority for International Application No. PCT/FI2016/050219.
Written Opinion (PCT/ISA/237) dated Jul. 7, 2016, by the European Patent Office as the International Searching Authority for International Application No. PCT/FI2016/050219.

* cited by examiner

METHOD AND ARRANGEMENT FOR OPERATING A METALLURGICAL FURNACE AND COMPUTER PROGRAM PRODUCT

FIELD OF THE INVENTION

When operating a metallurgical furnace such as a suspension smelting furnace, an electric arc furnace, a top submerged lance furnace or a bottom blown furnace, it is advantageous if the molten content in the furnace space of the metallurgical furnace is allowed to form a semi-solidified or solidified protective layer or coating at the inner walls of the metallurgical furnace, because such protective layer protects the inner walls of the metallurgical furnace against the molten content in the furnace space of the metallurgical furnace. If on one hand, the temperature of the molten content in the metallurgical furnace is allowed to raise too much, the protective layer melts and the inner walls of the furnace space becomes exposed to the molten content in the furnace space of the metallurgical furnace. If on the other hand, if the temperature of the molten content in the metallurgical furnace is allowed to lower too much, the thickness protective layer melts increases unnecessarily and the effective furnace space is reduced.

OBJECTIVE OF THE INVENTION

The object of the invention is to provide a method and an arrangement for operating a metallurgical furnace, which solves the above-identified problems.

SHORT DESCRIPTION OF THE INVENTION

The invention is based on measuring the slag temperature and measuring the slag liquidus temperature directly or indirectly through the slag analysis and calculating a superheat temperature by calculating the difference between the slag temperature and the slag liquidus temperature and on determining whether the calculated superheat temperature is within a predefined superheat temperature range or not. In case the calculated superheat temperature is not within the predefined superheat temperature range, an adjusting step is performed.

In case the slag liquidus temperature is measured directly, a positherm immersion lance provided by Heraeus Electro-Nite can be used.

In case the slag liquidus temperature is measured indirectly through the slag analysis, the analysis results must be available quick enough and a laser-induced breakdown spectrometry (LIBS) analyzer can be used, together with a computer program to calculate the slag liquidus temperature based on the elemental analysis of the melt.

By keeping the superheat temperature is within a predefined superheat temperature range, the temperature of the slag is kept so that the molten slag in the furnace space of the metallurgical furnace is allowed to form a semi-solidified or solidified protective layer or coating at the inner walls of the metallurgical furnace, however so that the thickness protective layer is not allowed to increase unnecessarily.

LIST OF FIGURES

In the following the invention will described in more detail by referring to the figures, which

DETAILED DESCRIPTION OF THE INVENTION

The invention relates to method for operating a metallurgical furnace 4, to an arrangement for operating a metallurgical furnace 4, and to a computer program product.

First the method for operating a metallurgical furnace 4 and some preferred embodiments and variants of the method will be described in greater detail.

The method comprises a feeding step for feeding metal-containing feed material and optionally at least one of reaction gas, reduction agent, coolant, and hydrocarbon based fuel continuously or batch wise into a furnace space 3 of the metallurgical furnace 4 to form a molten metal containing layer 1 and a slag layer 2 on top of the molten metal containing layer 1 in the furnace space 3 of the metallurgical furnace 4.

The metal-containing material can for example be at least one of the following: solid metal-containing feed material such as sulfidic metal-concentrate and liquid slag containing metal, or a mixture of at least two of these.

The reaction gas can for example contain at least one of the following: air, technical oxygen, or oxygen enriched air with oxygen enrichment in the range between 20.8% and 100%.

The reduction agent can for example be at least one of the following: as coke, ferro silica or aluminum containing material, which can for example configured to react with slag containing metal in the furnace space 3 of the metallurgical furnace 4.

The coolant can for example contain at least one of the following: liquid coolant, such as water, water solution, and sulphuric acid of varying strength (0 to 100%) or a mixture of at least two of these, or solid coolant, such as dust, limestone, lime flux, reduction agent, crushed slag crushed matte, crushed metal, and crushed blister, or a mixture of at least two of these.

The hydrocarbon based fuel can for example contain at least one of the following: heavy fuel oil, light fuel oil, diesel oil, pulverized coke, pulverized coal, lumped coke, natural gas, propane gas, biomass fuel, wood pellets, municipal waste based fuel, industrial waste based fuel and electronic scrap material, or a mixture of at least two of these.

Figure 1:
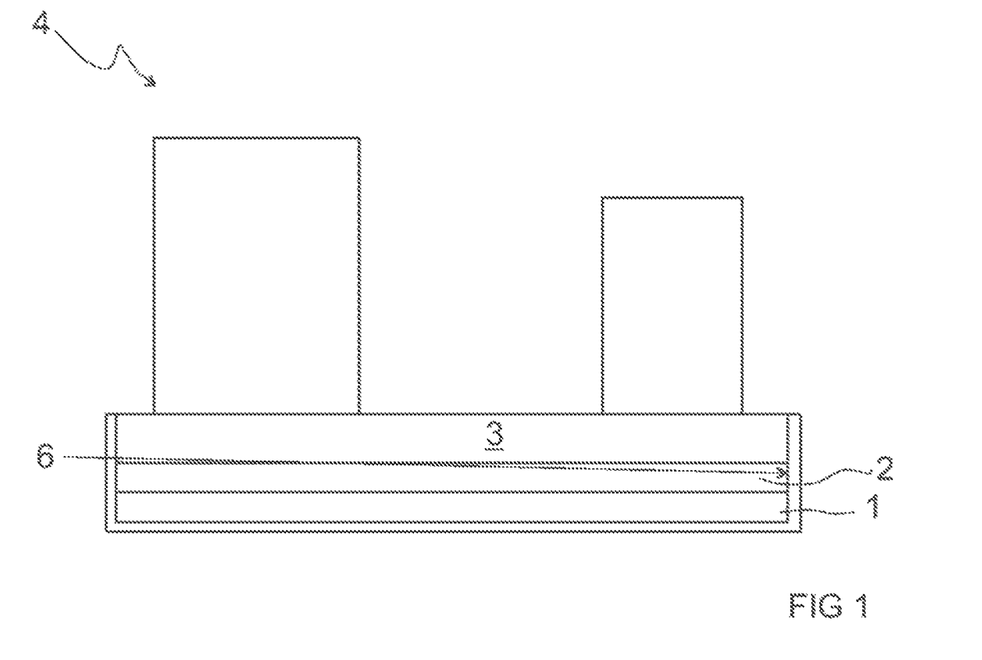
FIG. 1 shows a metallurgical furnace in the form of a suspension smelting furnace.
Figure 2:
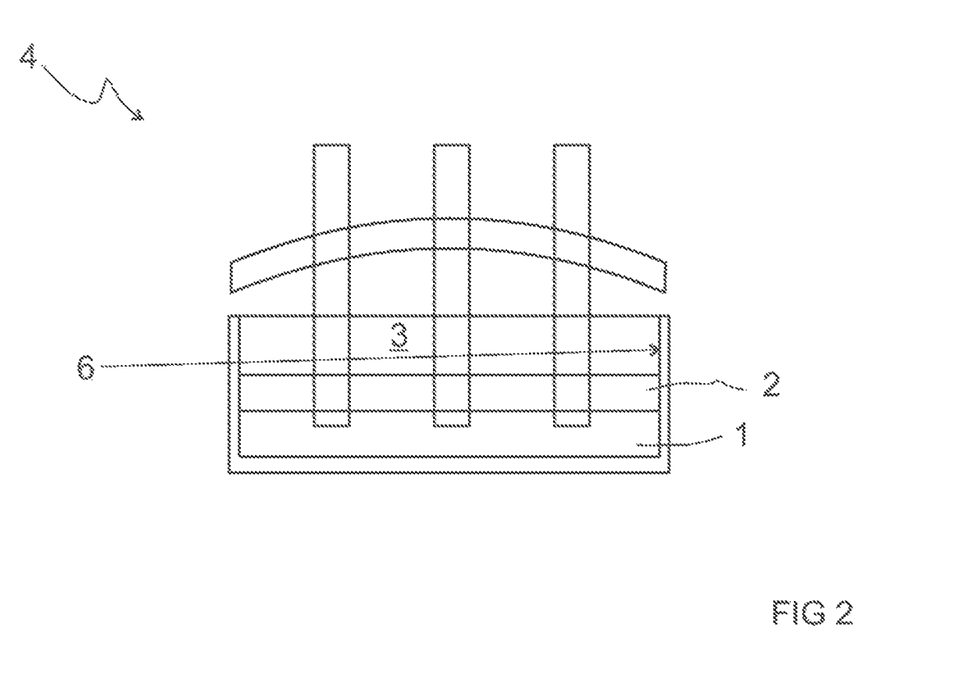
FIG. 2 shows a metallurgical furnace in the form of an electric arc furnace.
Figure 3:
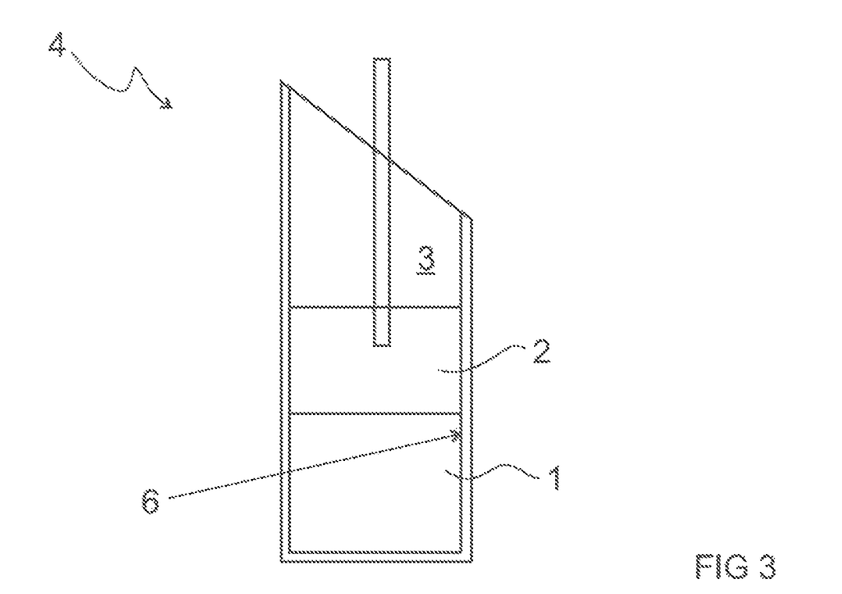
FIG. 3 shows a metallurgical furnace in the form of a top submerged lance furnace.
Figure 4:
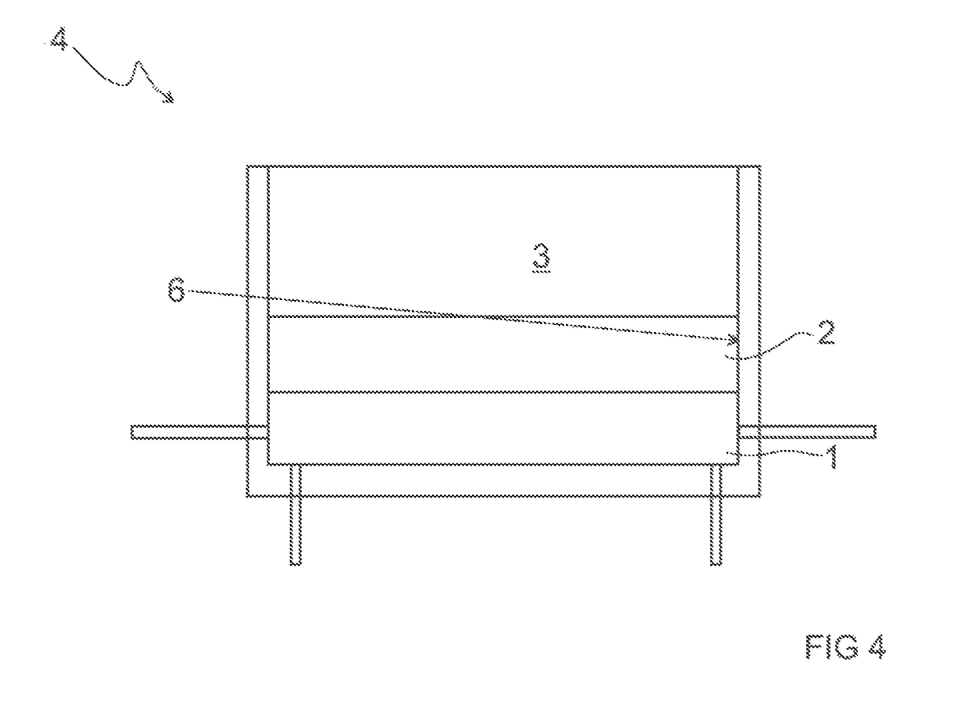
FIG. 4 shows a metallurgical furnace in the form of a bottom blown furnace.
Figure 5:
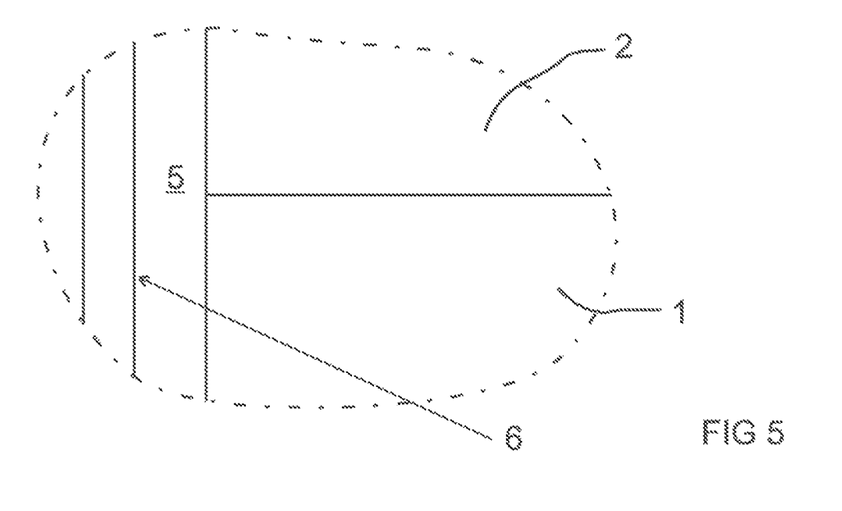
FIG. 5 shows a detail view of a metallurgical furnace.
Figure 6:
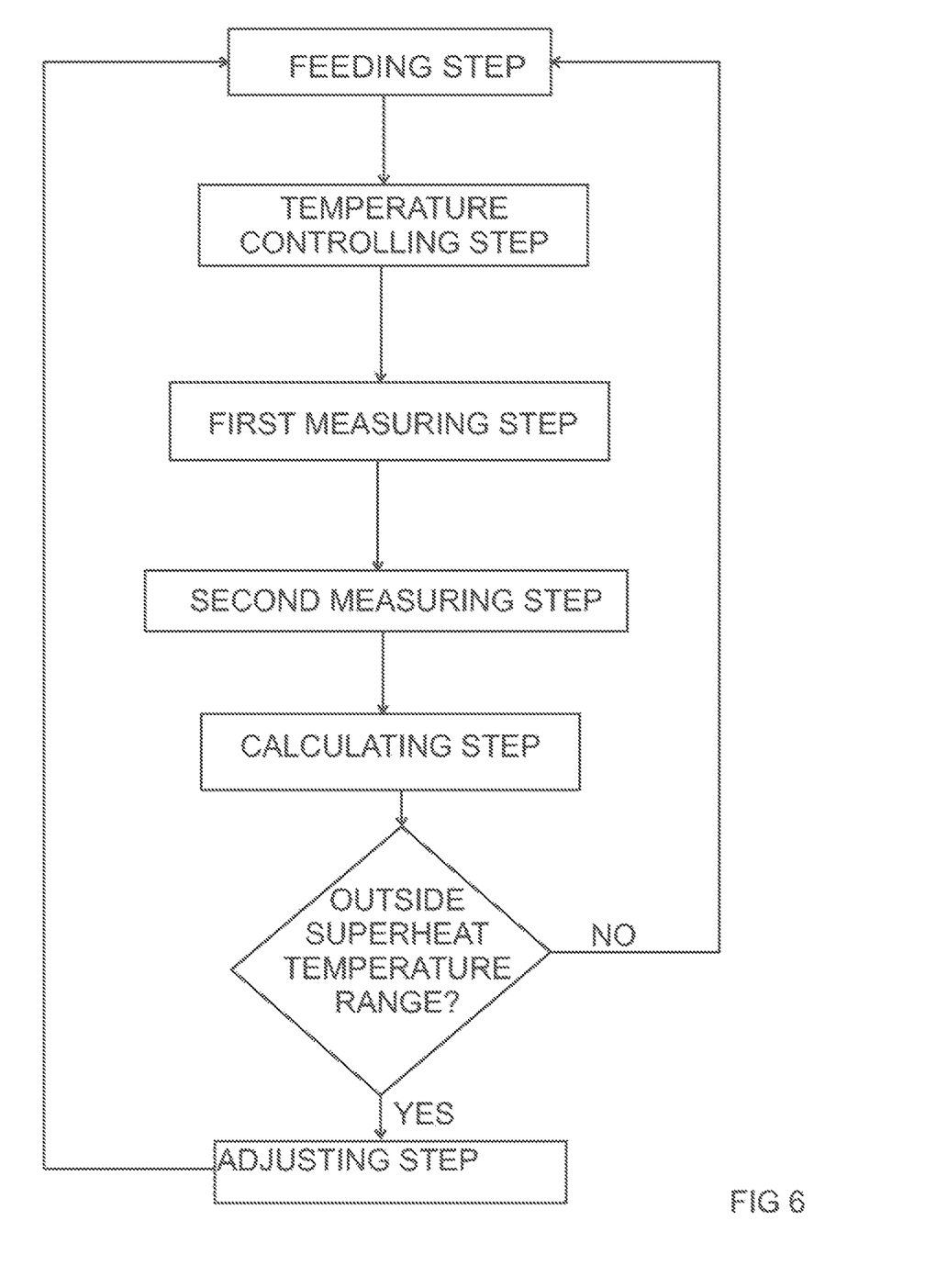
FIG. 6 shows a flow sheet of an embodiment of the method.
Figure 7:
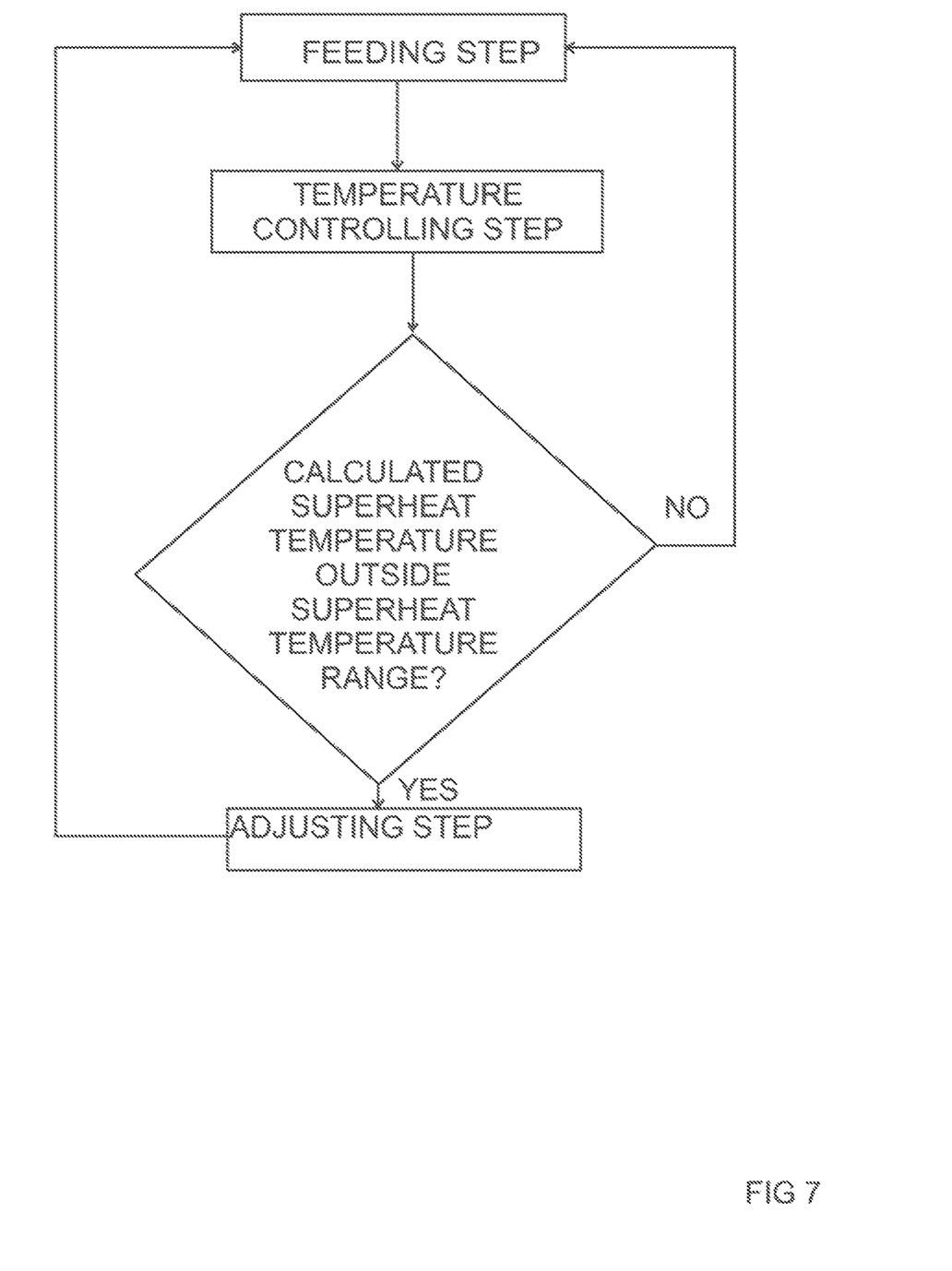
FIG. 7 shows a flow sheet of another embodiment of the method.

The metallurgical furnace 4 can for example be a suspension smelting furnace such as a flash smelting furnace as shown in FIG. 1, an electric arc furnace as shown in FIG. 2, a top submerged lance furnace as shown in FIG. 3, or a bottom blown furnace as shown in FIG. 4.

The molten metal-containing layer 1 can contain for example matte, blister, metal alloy, metal, iron, or lead bullion, or a mixture of at least two of these.

The method comprises a temperature controlling step for controlling the temperature of the molten metal-containing layer 1 and the slag layer 2 in the furnace space 3 of the metallurgical furnace 4.

The temperature controlling step can comprise adjusting at least one of the following:
  (i) feed rate of the metal-containing feed material, is fed into the furnace space 3 of the metallurgical furnace 4,
  (ii) composition of the metal-containing feed material is fed into the furnace space 3 of the metallurgical furnace 4,
  (iii) feed rate of the reaction gas is fed into the furnace space 3 of the metallurgical furnace 4,
  (iv) composition of the reaction gas is fed into the furnace space 3 of the metallurgical furnace 4,
  (v) feeding rate of coolant that is fed into the furnace space 3 of the metallurgical furnace 4,
  (vi) composition of coolant that is fed into the furnace space 3 of the metallurgical furnace 4,
  (vii) feed rate of hydrocarbon based fuels that is fed into the furnace space 3 of the metallurgical furnace 4,
  (viii) composition of hydrocarbon based fuels that is fed into the furnace space 3 of the metallurgical furnace 4,
  (ix) temperature of any of the solid, liquid or gas material that is fed into the furnace space 3 of the metallurgical furnace, and
  (x) heating by different amounts of electrical energy The method comprises a first measuring step for measuring the slag temperature ($T_{slag}$).

The method comprises a second measuring step for measuring the slag liquidus temperature ($T_{slag,\ liquidus}$).

The first measuring step and the second measuring step can for example be made by using a positherm immersion lance provided by Heraeus Electro-Nite.

The second step can also be measured indirectly through the slag analysis, the molten slag must be quickly analyzed and for this purpose a laser-induced breakdown spectrometry (LIBS) analyzer can be used, together with a computer program to calculate the slag liquidus temperature based on the elemental analysis of the melt.

The method comprises a calculating step for calculating a superheat temperature ($T_{superheat}$) by calculating the temperature difference between the slag temperature ($T_{slag}$) and the slag liquidus temperature ($T_{slag,\ liquidus}$).

In case the calculated superheat temperature ($T_{superheat}$) is outside a predefined superheat temperature range ($T_{superheat\ set}$), the method comprises an adjusting step for adjusting at least one of the following:
  (i) feed rate of the metal-containing feed material, is fed into the furnace space 3 of the metallurgical furnace 4,
  (ii) composition of the metal-containing feed material is fed into the furnace space 3 of the metallurgical furnace 4,
  (iii) feed rate of the reaction gas is fed into the furnace space 3 of the metallurgical furnace 4,
  (iv) composition of the reaction gas is fed into the furnace space 3 of the metallurgical furnace 4,
  (v) feeding rate of coolant that is fed into the furnace space 3 of the metallurgical furnace 4,
  (vi) composition of coolant that is fed into the furnace space 3 of the metallurgical furnace 4,
  (vii) feed rate of hydrocarbon based fuels that is fed into the furnace space 3 of the metallurgical furnace 4,
  (viii) composition of hydrocarbon based fuels that is fed into the furnace space 3 of the metallurgical furnace 4,
  (ix) temperature of any of the solid, liquid or gas material that is fed into the furnace space 3 of the metallurgical furnace 4, and
  (x) heating by different amounts of electrical energy
to raise the actual superheat temperature if the calculated superheat temperature ($T_{superheat}$) is below the predefined superheat temperature range ($T_{superheat\ set}$) or to lower the actual superheat temperature if the calculated superheat temperature ($T_{superheat}$) is above the predefined superheat temperature range ($T_{superheat\ set}$).

By keeping the superheat temperature is within a predefined superheat temperature range, the temperature of the slag in the slag layer 2 is kept so that the molten content in the furnace space 3 of the metallurgical furnace 4 is allowed to form a semi-solidified or solidified protective layer 5 or coating at the inner walls 6 of the metallurgical furnace 4, however so that the thickness protective layer 5 is not allowed to increases unnecessarily.

The predefined superheat temperature range can for example be between −30° and 250° C., such as between −10° and 150° C., preferably between −10° and 100° C., or such as between 30° and 250° C. The predefined superheat temperature range depends on the content of the slag in the slag layer 2. The method can comprise a forming step for forming and maintaining a semi-solidified or solidified protective layer 5 or coating at the inner walls 6 of the metallurgical furnace 4. In such case, the temperature controlling step includes preferably, but not necessarily, keeping the calculated superheat temperature ($T_{superheat}$) within the predefined superheat temperature range ($T_{superheat\ set}$) so as to maintain the semi-solidified or solidified protective layer 5 or coating at the inner walls 6 of the metallurgical furnace 4.

Next the arrangement for operating a metallurgical furnace 4 and some preferred embodiments and variants of the arrangement will be described in greater detail.

The arrangement comprises feeding means configured to for feed metal-containing feed material and optionally at least one of reaction gas, reduction agent, coolant, and hydrocarbon based fuels continuously or batch wise into a furnace space 3 of the metallurgical furnace 4 to form a molten metal containing layer 1 and a slag layer 2 on top of the molten metal containing layer 1 in the furnace space 3 of the metallurgical furnace 4.

The metal-containing material can for example be at least one of the following: solid metal-containing feed material and liquid slag containing metal or a mixture of at least two of these.

The reaction gas can for example contain at least one of the following: oxygen or oxygen enriched air with oxygen enrichment in the range between 20.8% and 100%.

The reduction agent can for example be at least one of the following: as coke, ferro silica or aluminum containing material, or a mixture of at least two of these.

The coolant can for example contain at least one of the following: liquid coolants, such as water, water solutions, and sulphuric acid of varying strength (0 to 100%) or a mixture of at least two of these, or solid coolants, such as dust, limestone, lime flux, reduction agent, crushed slag crushed matte, crushed metal, and crushed blister, or a mixture of at least two of these.

The hydrocarbon based fuel can for example contain at least one of the following: heavy fuel oil, light fuel oil, diesel oil, pulverized coke, pulverized coal, lumped coke, natural gas, propane gas, biomass fuel, wood pellets, municipal waste based fuel, industrial waste based fuel and electronic scrap material, or a mixture of at least two of these The metallurgical furnace 4 can for example be a suspension smelting furnace such as a flash smelting furnace as shown in FIG. 1, an electric arc furnace as shown in FIG. 2, a top submerged lance furnace as shown in FIG. 3, or a bottom blown furnace as shown in FIG. 4.

The molten metal-containing layer 1 can contain for example matte, blister, metal alloy, metal, iron, or lead bullion, or a mixture of at least two of these.

The arrangement comprises temperature controlling means configured to control the temperature of the molten metal-containing layer 1 and the slag layer 2 in the furnace space 3 of the metallurgical furnace 4. The temperature controlling means can be configured to generate a control signal for a processor controlling at least one of the following:
(i) feed rate of the metal-containing feed material, is fed into the furnace space 3 of the metallurgical furnace 4,
(ii) composition of the metal-containing feed material is fed into the furnace space 3 of the metallurgical furnace 4,
(iii) feed rate of the reaction gas is fed into the furnace space 3 of the metallurgical furnace 4,
(iv) composition of the reaction gas is fed into the furnace space 3 of the metallurgical furnace 4,
(v) feeding rate of coolant that is fed into the furnace space 3 of the metallurgical furnace 4,
(vi) composition of coolant that is fed into the furnace space 3 of the metallurgical furnace 4,
(vii) feed rate of hydrocarbon based fuels that is fed into the furnace space 3 of the metallurgical furnace 4,
(viii) composition of hydrocarbon based fuels that is fed into the furnace space 3 of the metallurgical furnace 4,
(ix) temperature of any of the solid, liquid or gas material that is fed into the furnace space 3 of the metallurgical furnace 4, and
(x) heating by different amounts of electrical energy The temperature controlling means comprises a first measuring means configured to measure the slag temperature ($T_{slag}$).

The temperature controlling means comprises a second measuring means configured to measure the slag liquidus temperature ($T_{slag,\ liquidus}$).

The temperature controlling means comprises a calculating means configured to calculate a superheat temperature ($T_{superheat}$) by calculating the temperature difference between the slag temperature ($T_{slag}$) and the slag liquidus temperature ($T_{slag,\ liquidus}$).

In case the calculated superheat temperature ($T_{superheat}$) is outside a predefined superheat temperature range ($T_{superheat\ set}$), the temperature controlling means is configured to generate a control signal for a processor controlling at least one of the following:
(i) feed rate of the metal-containing feed material, is fed into the furnace space 3 of the metallurgical furnace 4,
(ii) composition of the metal-containing feed material is fed into the furnace space 3 of the metallurgical furnace 4,
(iii) feed rate of the reaction gas is fed into the furnace space 3 of the metallurgical furnace 4,
(iv) composition of the reaction gas is fed into the furnace space 3 of the metallurgical furnace 4,
(v) feeding rate of coolant that is fed into the furnace space 3 of the metallurgical furnace 4,
(vi) composition of coolant that is fed into the furnace space 3 of the metallurgical furnace 4,
(vii) feed rate of hydrocarbon based fuels that is fed into the furnace space 3 of the metallurgical furnace 4,
(viii) composition of hydrocarbon based fuels that is fed into the furnace space 3 of the metallurgical furnace 4,
(ix) temperature of any of the solid, liquid or gas material that is fed into the furnace space 3 of the metallurgical furnace 4, and
(x) heating by different amounts of electrical energy to raise the actual superheat temperature if the calculated superheat temperature ($T_{superheat}$) is below the predefined superheat temperature range ($T_{superheat\ set}$) or to lower the actual superheat temperature if the calculated superheat temperature ($T_{superheat}$) is above the predefined superheat temperature range ($T_{superheat\ set}$).

By keeping the superheat temperature is within a predefined superheat temperature range, the temperature of the slag in the slag layer 2 is kept so that the molten content in the furnace space 3 of the metallurgical furnace 4 is allowed to form a semi-solidified or solidified protective layer 5 or coating at the inner walls 6 of the metallurgical furnace 4, however so that the thickness protective layer 5 is not allowed to increases unnecessarily.

The predefined superheat temperature range can for example be between −30° and 250° C., such as between −10° and 150° C., preferably between −10° and 100° C., or such as between 30° and 250° C. The predefined superheat temperature range depends on the content of the slag in the slag layer 2.

The temperature controlling means are preferably, but not necessarily, configured to control the temperature of the molten metal-containing layer 1 and the slag layer 2 in the furnace space 3 of the metallurgical furnace 4 so that a semi-solidified or solidified protective layer 5 or coating is formed and maintained at the inner walls 6 of the metallurgical furnace 4. In such case, the temperature controlling means are preferably, but not necessarily, configured to generate the control signal for the processor to maintain the calculated superheat temperature ($T_{superheat}$) within the predefined superheat temperature range ($T_{superheat\ set}$) so as to maintain the semi-solidified or solidified protective layer 5 or coating at the inner walls 6 of the metallurgical furnace 4.

The invention relates also to a computer program product comprising program code for a processing device, the computer program product comprising program code for:
receiving a first electric signal representing slag temperature ($T_{slag}$) of a slag layer 2 contained in a furnace space 3 of a metallurgical furnace 4,
receiving a second electric signal representing liquidus temperature ($T_{slag,\ liquidus}$) of slag in the slag layer 2 contained in the furnace space 3 of the metallurgical furnace 4,
calculating a superheat temperature ($T_{superheat}$) by calculating the temperature difference between the slag temperature ($T_{slag}$) and the slag liquidus temperature ($T_{slag,\ liquidus}$),
determining if the calculated superheat temperature ($T_{superheat}$) is inside or outside a predefined superheat temperature range ($T_{superheat\ set}$), and
generating a control signal for the processing device if the calculated superheat temperature ($T_{superheat}$) is outside the predefined superheat temperature range ($T_{superheat\ set}$).

The invention relates also to a computer program product for use in the method according to any embodiment described herein or for use in the arrangement according to any embodiment described herein, the computer program product comprising program code for:
receiving a first electric signal representing slag temperature ($T_{slag}$) of a slag layer 2 contained in a furnace space 3 of a metallurgical furnace 4,
receiving a second electric signal representing liquidus temperature ($T_{slag,\ liquidus}$) of slag in the slag layer (2) contained in the furnace space (3) of the metallurgical furnace (4), calculating a superheat temperature ($T_{superheat}$) by calculating the temperature difference between the slag temperature ($T_{slag}$) and the slag liquidus temperature ($T_{slag,\ liquidus}$), determining if the calculated superheat temperature ($T_{superheat}$) is inside or outside a predefined superheat temperature range ($T_{superheat\ set}$), and generating a control signal for the processing device if the calculated superheat temperature ($T_{superheat}$) is outside the predefined superheat temperature range ($T_{superheat\ set}$).

It is apparent to a person skilled in the art that as technology advances, the basic idea of the invention can be implemented in various ways. The invention and its embodiments are therefore not restricted to the above examples, but they may vary within the scope of the claims.

The invention claimed is:

1. A method for operating a metallurgical furnace, wherein the method comprises:
    a feeding step for feeding metal-containing feed material and optionally at least one of reaction gas, reduction agent, coolant, and hydrocarbon based fuels into a furnace space of the metallurgical furnace to form a molten metal-containing layer and a slag layer on top of the molten metal containing layer in the furnace space of the metallurgical furnace, and
    a temperature controlling step for controlling the temperature of the molten metal layer and the slag layer in the furnace space of the metallurgical furnace,
    wherein the temperature controlling step comprises
    a first measuring step for directly measuring the slag temperature ($T_{slag}$),
    a second measuring step for directly measuring the slag liquidus temperature ($T_{slag,\ liquidus}$), and
    a calculating step for calculating a superheat temperature ($T_{superheat}$) by calculating the temperature difference between the slag temperature ($T_{slag}$) and the slag liquidus temperature ($T_{slag,\ liquidus}$),
    and in case the calculated superheat temperature ($T_{superheat}$) is outside a predefined superheat temperature range ($T_{superheat\ set}$), the method comprises an adjusting step for adjusting at least one of the following:
    (i) feed rate of the metal-containing feed material, that is fed into the furnace space of the metallurgical furnace,
    (ii) composition of the metal-containing feed material that is fed into the furnace space of the metallurgical furnace,
    (iii) feed rate of the reaction gas that is fed into the furnace space of the metallurgical furnace,
    (iv) composition of the reaction gas that is fed into the furnace space of the metallurgical furnace,
    (v) feeding rate of coolant that is fed into the furnace space of the metallurgical furnace,
    (vi) composition of coolant that is fed into the furnace space of the metallurgical furnace,
    (vii) feed rate of hydrocarbon based fuels that is fed into the furnace space of the metallurgical furnace,
    (viii) composition of hydrocarbon based fuels that is fed into the furnace space of the metallurgical furnace,
    (ix) temperature of any of the solid, liquid or gas material that is fed into the furnace space of the metallurgical furnace, and
    (x) heating by different amounts of electrical energy
    to raise the actual superheat temperature if the calculated superheat temperature ($T_{superheat}$) is below the predefined superheat temperature range ($T_{superheat\ set}$) or to lower the actual superheat temperature if the calculated superheat temperature ($T_{superheat}$) is above the predefined superheat temperature range ($T_{superheat\ set}$),
    a forming step for forming and maintaining a semi-solidified or solidified protective layer or coating at the inner walls of the metallurgical furnace, and
    wherein the temperature controlling step includes keeping the calculated superheat temperature ($T_{superheat}$) within the predefined superheat temperature range ($T_{superheat\ set}$) so as to maintain the semi-solidified or solidified protective layer or coating at the inner walls of the metallurgical furnace.

2. The method according to claim 1, wherein the predefined superheat temperature range ($T_{superheat\ set}$) is between −30° and 250° C.

3. The method according to claim 1, wherein the predefined superheat temperature range ($T_{superheat\ set}$) is between −10° and 150° C.

4. The method according to claim 1, wherein the predefined superheat temperature range ($T_{superheat\ set}$) is between −10° and 100° C.

5. The method according to claim 1, wherein the predefined superheat temperature range ($T_{superheat\ set}$) is between 30° and 250° C.

6. The method according to claim 1, wherein the measuring the slag liquidus temperature is measured indirectly by performing a slag analysis.

7. The method according to claim 1, wherein the measuring the slag liquidus temperature is measured directly.

8. An arrangement for operating a metallurgical furnace, wherein the arrangement comprises:
    feeding means configured to feed metal-containing feed material and optionally at least one of reaction gas, reduction agent, coolant, and hydrocarbon based fuels into a furnace space of the metallurgical furnace to form a molten metal containing layer and a slag layer on top of the molten metal-containing layer in the furnace space of the metallurgical furnace,
    a processor configured to control the temperature of the molten metal-containing layer and the slag layer in the furnace space of the metallurgical furnace,
    a first measuring means configured to directly measure the slag temperature ($T_{slag}$), and
    a second measuring means configured to directly measure the slag liquidus temperature ($T_{slag,\ liquidus}$), wherein
    the processor is configured to calculate a superheat temperature ($T_{superheat}$) by calculating the temperature difference between the slag temperature ($T_{slag}$) and the slag liquidus temperature ($T_{slag,\ liquidus}$),
    and in case the calculated superheat temperature ($T_{superheat}$) is outside a predefined superheat temperature range ($T_{superheat\ set}$), the processor is configured to generate a control signal for controlling at least one of the following:
    (i) feed rate of the metal-containing feed material, that is fed into the furnace space of the metallurgical furnace,
    (ii) composition of the metal-containing feed material that is fed into the furnace space of the metallurgical furnace,
    (iii) feed rate of the reaction gas that is fed into the furnace space of the metallurgical furnace,
    (iv) composition of the reaction gas that is fed into the furnace space of the metallurgical furnace,
    (v) feeding rate of coolant that is fed into the furnace space of the metallurgical furnace,
    (vi) composition of coolant that is fed into the furnace space of the metallurgical furnace,
    (vii) feed rate of hydrocarbon based fuels that is fed into the furnace space of the metallurgical furnace, (viii) composition of hydrocarbon based fuels that is fed into the furnace space of the metallurgical furnace, (ix) temperature of any of the solid, liquid or gas material that is fed into the furnace space of the metallurgical furnace, and (x) heating by different amounts of electrical energy to raise the actual superheat temperature if the calculated superheat temperature ($T_{superheat}$) is below the predefined superheat temperature range ($T_{superheat\ set}$) or to lower the actual superheat temperature if the calculated superheat temperature ($T_{superheat}$) is above the predefined superheat temperature range ($T_{superheat\ set}$), the processor being configured to control the temperature of the molten metal-containing layer and the slag layer in the furnace space of the metallurgical furnace so that a semi-solidified or solidified protective layer or coating is formed and maintained at the inner walls of the metallurgical furnace, and the processor being configured to generate the control signal for the processor to maintain the calculated superheat temperature ($T_{superheat}$) within the predefined superheat temperature range ($T_{superheat\ set}$) so as to maintain the semi-solidified or solidified protective layer or coating at the inner walls of the metallurgical furnace.

9. The arrangement according to claim 8, wherein the predefined superheat temperature range ($T_{superheat\ set}$) is between −30° and 250° C.

10. The arrangement according to claim 8, wherein the predefined superheat temperature range ($T_{superheat\ set}$) is between −10° and 150° C.

11. The arrangement according to claim 8, wherein the predefined superheat temperature range ($T_{superheat\ set}$) is between −10° and 100° C.

12. The arrangement according to claim 8, wherein the predefined superheat temperature range ($T_{superheat\ set}$) is between 30° and 250° C.

* * * * *